UNITED STATES PATENT OFFICE.

GERARDUS JACOBUS VAN SWAAY, OF DELFT, AND HENRI ISAAC KEUS, OF HENGELO, NETHERLANDS.

SYNCHRONISM-INDICATOR.

1,234,584.  Specification of Letters Patent.  Patented July 24, 1917.

Application filed March 16, 1915. Serial No. 14,798.

*To all whom it may concern:*

Be it known that we, GERARDUS JACOBUS VAN SWAAY, residing at Delft, Holland, and HENRI ISAAC KEUS, residing at Hengelo, Holland, subjects of the Queen of the Netherlands, have invented certain new and useful Improvements in and Relating to Synchronism-Indicators, of which the following is a specification.

This invention relates to a synchronism indicator adapted to indicate automatically the moment in which two machines may be connected in parallel to the same network, the construction of this indicator being such that at the moment the required equality in frequency, phase and voltage between the machines occurs the machines are connected in parallel either automatically by the indicator closing a relay-circuit of the main switches or by hand. The regulation of the speed of the machines and if necessary also of the voltage to obtain the required equality is effected by hand.

Of the three factors, frequency, phase and voltage, the last mentioned one is less important than the others, because with not exactly equal voltages but equality in frequency and phase only wattless currents arise. It is moreover not to be feared that the voltages become unequal, as in most central stations the voltage is regulated automatically. A small difference between the voltages of both machines cannot prevent or unfavorably affect the connecting in parallel.

The synchronism indicator according to the present invention comprises a well known movable element, such as a disk, subjected to the action of magnetic fields. The invention substantially consists in the provision in such indicator of two electromagnets, one of which is energized by the current of one machine or of the network, and the other by the current of the machine to be connected in parallel, in such a manner that said currents excite fields in said magnets having a phase displacement with respect to each other, said electromagnets being further arranged with relation to the movable element so as to subject said element to a swinging movement as long as the frequencies of said currents differ, but to cause said movable element to come to rest on equality in frequency and phase coincidence being attained in a position dependent on the relation of the voltages to be connected in parallel.

Another important feature over the well known apparatus is presented by the fact that by a simple operation the machines can be so connected to the apparatus that the voltages of each of the machines individually are indicated or the voltages of both machines can be compared.

The apparatus according to the invention may further be so constructed that in case during the synchronizing period the voltage of the machines to be connected in parallel rises above the required voltage a maximum cutout arranged in the relay-circuit of the main switches comes into action preventing these switches being closed automatically.

The invention is further described with reference to the accompanying drawings, of which:

Figure 1:
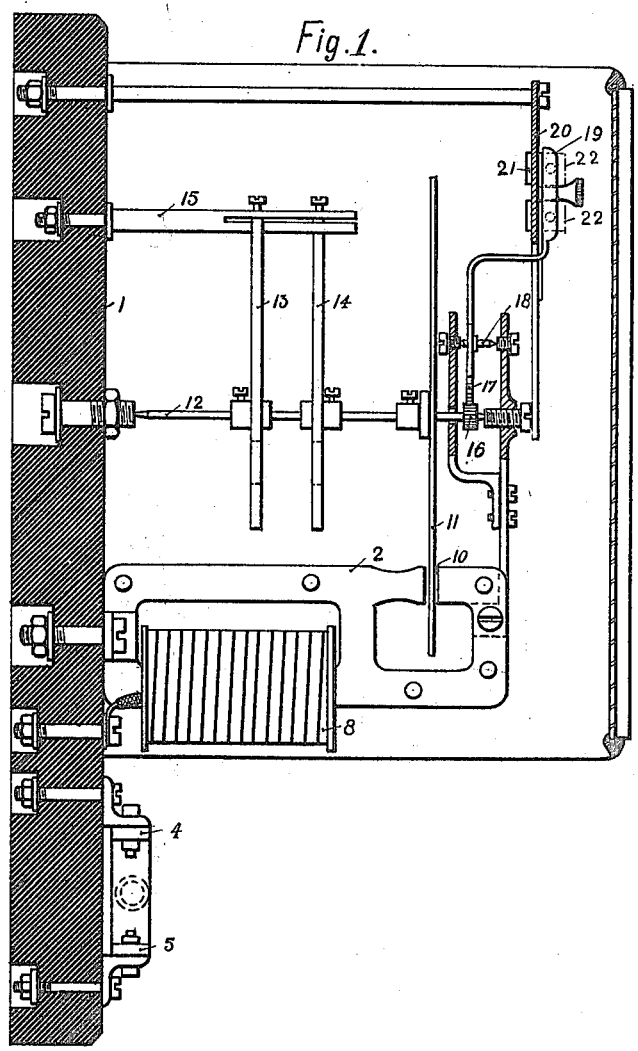
Figure 1 is a vertical cross section through the middle of the apparatus.
Figure 2:
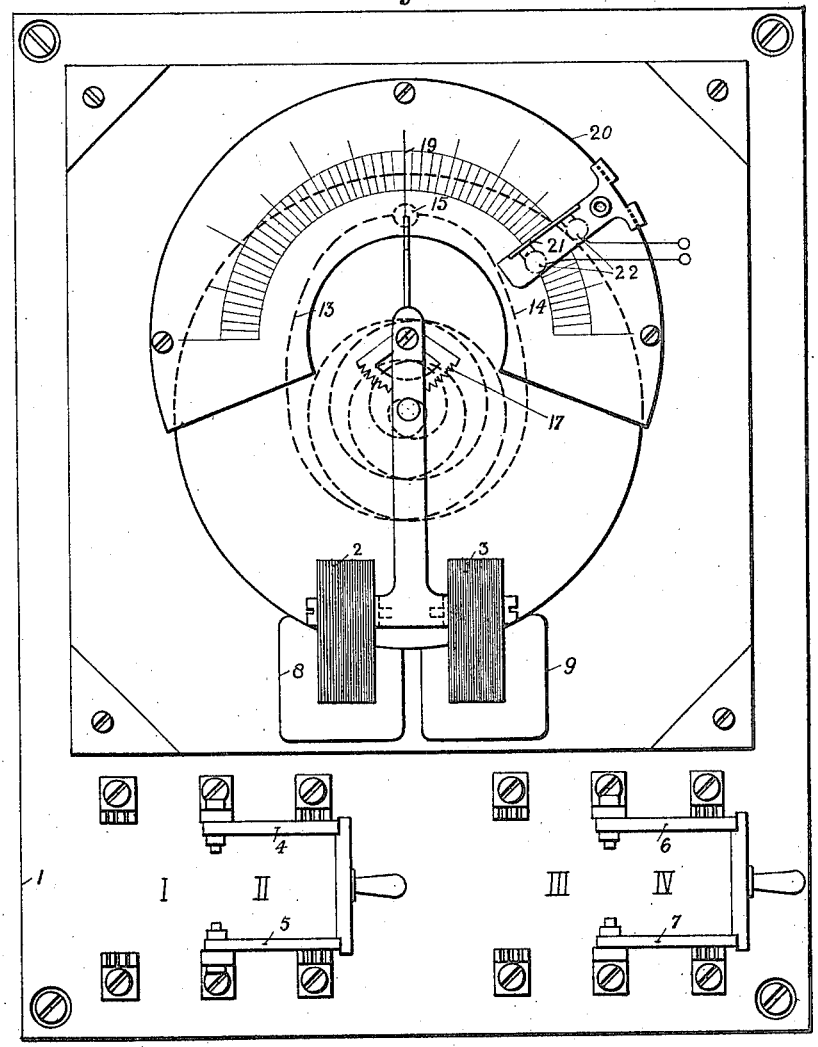
Fig. 2 is a front view of the apparatus.
Figure 3:
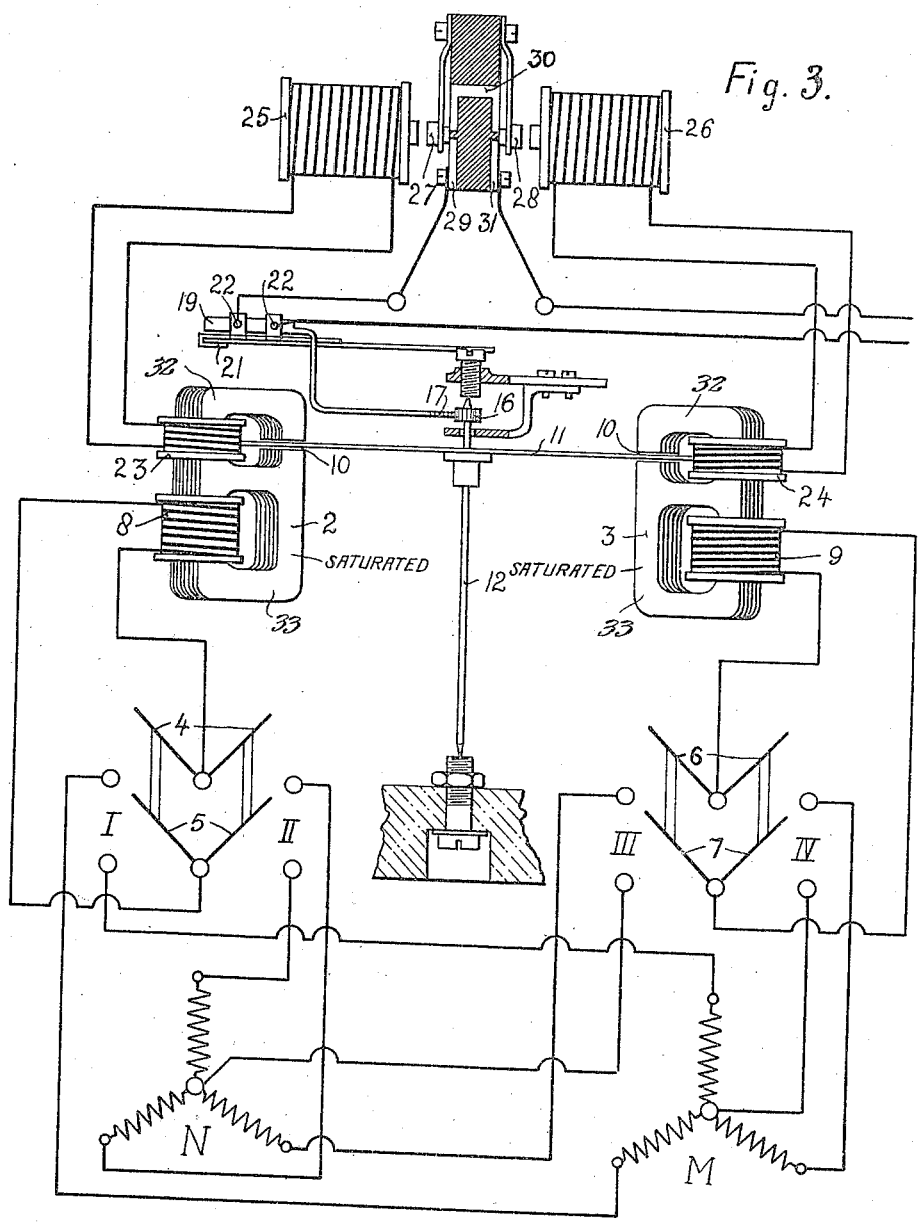
Fig. 3 shows a complete diagram of connections including a maximum cut out device introduced in the relay circuit of the main switches.

An insulating supporting plate 1 carries the magnets 2 and 3 supplied with alternating current. As shown in Fig. 3 said magnets are electrically connected to switch blades 4, 5 and 6, 7 respectively.

The magnets are preferably provided with two magnetic circuits one of which indicated by 32 is provided with an air-gap and arranged in parallel to the other or closed magnetic circuit 33, the latter being highly saturated at normal impressed voltage, while the former is unsaturated under the same conditions. Alterations in the voltage therefore cause disproportional variations in the air-gap magnetic field, so that the aluminum disk 11 rotatable on the axis 12 and arranged in the air-gap is subjected to the action of a disproportional field. Such magnets render the apparatus much more efficient than the magnets with a single magnetic circuit.

When the apparatus is out of service the disk 11 is kept in the middle position by two oppositely wound spiral springs 13 and 14 each connected with one extremity to a fixed post and with the other extremity to the axis 12. It should be understood that as will be explained farther on the disk needs only be subjected to the action of a spring or the like in one direction and in the other direction it may beat against a stop or other arresting device. By means of a pinion 16 the movements of the axis 12 are transmitted to a toothed segment 17, a pointer 19 and their axis 18. Behind this pointer the dial plate 20 is situated. This plate is provided with a volt scale and carries the adjustable element 21 and, if desired, the synchronizing contacts 22 one of which may be electrically connected to the pointer 19, while the other contact is insulated from the pointer and the circuit is not closed before the pointer 19 touches this contact upon the maximum force acting on the disk 11. The contacts may also both be insulated from the pointer and so arranged that the pointer acts as a bridging contact.

In positions II and IV of the switch blades 4, 5 and 6, 7 respectively the line voltage of the network N is connected to the coil 8 and the phase-voltage of the machine M to the coil 9. When the two machines are running exactly in synchronism and the voltages are equal and precisely in phase the phase displacement between these voltages is 90° and consequently the disk is subjected to the maximum torque. When the machines are out of synchronism the direction of the fields is continuously varying and a swinging action of the disk is set up. The swinging movement around the middle position will be the quicker the greater the difference between the two frequencies is. The greater the deflection of the pointer the smaller is also the difference in frequency; in other words the number of oscillations within a certain period of time is a measure for the inequality of the frequencies.

During synchronizing the maximum torque can only arise in two cases provided that the switch blades are in positions II and IV, namely:

*a.* When the disk 11 is subjected to the action of fields excited by voltages having a phase difference of exactly 90°; in other words when between the corresponding voltages of the machine and the network or of the machines phase-coincidence occurs.

*b.* When the disk 11 is subjected to the action of magnetic fields excited by voltages having a phase difference of exactly 270° or in other words, when between the corresponding voltages of the machine and the network or of the machines a phase difference of 180° exists.

Only in the extreme position of the pointer in case *a* it is allowed to connect in parallel. The extreme position in case *b*, being opposite in relation to the middle position to the side where the element 21 is placed, has no effect. It is obvious that the pointer needs not deflect to this side and may be arrested by a stop instead of a spring.

The three conditions which should be satisfied before the main switches may be thrown in are only satisfied for a short period. At a difference in frequency of 0.1 per cent. and 50 cycles the movement of the pointer is reversed after 10 seconds during which period it remains in the extreme position mentioned under *a*, keeping the relay-circuit of the main switches closed. This period suffices to allow the relays to close the main switches, or to effect the throwing in of the main switch by hand if the apparatus is not provided with contacts 22.

The connecting in parallel is effected in the following manner:

The switches 4, 5 and 6, 7 are first placed in positions II and III respectively, so that the magnet coils 8, 9 are connected to the line and phase-voltages respectively of the net N. Thereupon the voltage (provided the same is not automatically kept constant) is regulated in such a way that the pointer 19 assumes a position above the adjustable element 21. If for one reason or the other it is not desirable to regulate the voltage then the element 21 is placed under the pointer 19. Hereupon the switches 4, 5 and 6, 7 are thrown over into the positions I and IV respectively and the voltage of the machine M is regulated in such a manner that the pointer 19 again comes to rest over the element 21. The apparatus hereby acts as a voltmeter for the machine M.

The two voltages now being equal the switches are placed in positions II and IV respectively. As a rule the disk 11 will begin to swing. If the number of oscillations increases with the speed of the machine this indicates that the machine to be switched in parallel runs too fast. When regulating the speed of the machine in the wrong direction the deflection of the pointer diminishes. By correspondingly altering the speed of the machine in the opposite direction the deflection of the pointer is increased until the latter assumes a position above the element 21. At this moment the machine may be connected in parallel manually or automatically. The apparatus therefore indicates, whether the speed of the machine to be switched in parallel is regulated in the right or in the wrong direction.

In the circuit of the contacts 22 the device shown at the top of Fig. 3 may be included. This device is adapted to prevent connecting in parallel, in case the voltage of the net or of the machine rises during the synchronizing period. A special device for preventing connecting in parallel when the voltage drops is superfluous, because in that case the pointer does not reach the element 21.

This auxiliary device only becomes necessary under very particular circumstances. The magnetic air-gap circuits 32 of the magnets 2 and 3 are provided with secondary coils 23, 24 adapted to energize electromagnets 25, 26 of maximum cut-outs. The armatures 27, 28 attached to springs carry contacts normally electrically connecting the contact plate 29, the strip 30 and the contact plate 31. The contact plates 29 and 31 are connected into the relay-circuit of the main switch, so that the current of this circuit passes from the plate 29 through the contact 27, the strip 30, the contact 28 and the plate 31. If the voltage of one of the two primary coils 8, 9 rises above the maximum predetermined value, the excess in voltage will cause a disproportional increase in the voltage of the corresponding secondary coil 23. 24 and the corresponding magnet 25, 26 will consequently be so energized that the armature is attracted. The circuit including the contacts 22 and the contacts 29, 30 and 31 is thus opened, so that automatic switching in of the main switch is prevented.

The apparatus according to the present invention possesses the following advantages:

1. Phase voltmeters are not required.
2. A zero voltmeter is superfluous, because the pointer 19 does not reach the position above the element 21, at which the machine to be connected in parallel may be switched in, unless there is equality in voltage between the network and the machine.
3. It is perceptible whether the speed of the machine to be connected in parallel must be increased or decreased during the synchronizing period.
4. Before connecting in parallel the voltages may be controlled readily and in a simple manner.
5. The apparatus allows for connecting in parallel automatically in a simple manner by means of a contact device.
6. The apparatus is simple in construction and handling, reliable and inexpensive.

It must be understood that the phase difference in the coils 8 and 9 for producing a torque on the disk 11 may be obtained in any other suitable manner. The disk itself may be circular as shown or of segmental form or may be replaced by any other movable member suitable for the purpose. In order to damp the swinging movement of the disk a steel magnet may be provided, so that the disk moves through the magnetic field of same.

Having now described our invention, what we claim as new and desire to secure by Letters Patent is:—

1. In a synchronism indicator comprising a movable element subjected to the action of magnetic fields, two electromagnets, one of which is energized by the current of one machine or of the network and the other by the current of the machine to be connected in parallel in such a manner that said currents excite fields in said magnets having a phase displacement with respect to each other, said electromagnets being further arranged with relation to the movable element so as to subject said element to a swinging movement as long as the frequencies differ, but to cause said movable element to come to rest on equality in frequency and phase coincidence being attained in a position dependent on the relation of the voltages of the two sources to be connected in parallel, and a yielding member producing a resisting force acting upon said movable element increasing with the distance of said element from its normal position.

2. In a synchronism indicator comprising a movable element subjected to the action of magnetic fields, two electromagnets connected to the machines or to the machine and the networks to be connected in parallel and acting upon the movable element so as to subject said element to a swinging movement as long as the frequencies in the machines or in the machine and the network to be connected in parallel differ, but to cause said movable element to adjust itself in a position dependent on the relation of the voltages of said magnets, a yielding member producing a resisting force acting upon said movable element, increasing with the distance of said element from its normal position, switching means for connecting both magnetizing coils of said electromagnets to each of the machines or to the network, a pointer connected to the movable element and a volt scale for indicating or comparing the voltages of the machines individually or of the network.

3. In a synchronism indicator comprising a movable element subjected to the action of magnetic fields, two electromagnets subjecting the movable element to a swinging movement as long as the frequencies in the machines or in the machine and the network differ, but causing said element to come to rest on equality in frequency and phase coincidence being attained, a yielding member producing a resisting force acting upon said movable element and increasing with the distance of said element from its normal position, switching means for connecting both magnetizing coils of said electromagnets to each of the machines or to the network, a pointer connected to said movable element, a volt scale, an element adjustable on said volt scale to indicate the angle of deflection of said pointer at the moment the required equality in frequency, phase and voltage is obtained.

4. In a synchronism indicator comprising a movable element subjected to the action of magnetic fields, two electromagnets subjecting the movable element to a swinging movement as long as the frequencies in the machines or in the machine and the network differ, but causing said element to come to rest on equality in frequency and phase coincidence being attained, a yielding member producing a resisting force acting upon said movable element and increasing with the distance of said element from its normal position, switching means for connecting both magnetizing coils of said electromagnets to each of the machines or to the network, a pointer connected to said movable element, a volt scale, an element adjustable on said volt scale, contacts on said adjustable element, said contacts being closed automatically by the pointer on the required equality in frequency, phase and voltage being obtained.

5. In a synchronism indicator comprising a movable element subjected to the action of magnetic fields, two electromagnets, one of which is energized by the current of one machine or of the network and the other by the current of the machine to be connected in parallel in such a manner that said currents excite fields in said magnets having a phase displacement with respect to each other, said electromagnets being further arranged with relation to the movable element so as to subject said element to a swinging movement as long as the frequencies differ, but to cause said movable element to come to rest on equality in frequency and phase coincidence being attained, in a position dependent on the relation of the voltages of the two sources to be connected in parallel, said magnets having two magnetic circuits, one of which is closed and highly saturated under normal working conditions and the other is provided with an air gap and unsaturated, the closed circuit receiving the magnetizing coils and the magnetic field in said air gap circuit acting upon said movable element.

6. In a synchronism indicator comprising a movable element, subjected to the action of magnetic fields, two electromagnets subjecting the movable element to a swinging movement as long as the frequencies in the machines or in the machine and the network differ, but causing said element to come to rest on equality in frequency and phase coincidence being attained, a yielding member producing a resisting force acting upon said movable element and increasing with the distance of said element from its normal position, adjustable contacts to be closed automatically by the movable element on the required equality in frequency, phase and voltage being obtained, lines leading from said contacts and an automatic circuit breaking device in said lines, breaking same on the voltage of one of the machines or of both machines rising above a predetermined value.

7. In a synchronism indicator comprising a movable element subjected to the action of magnetic fields, two electromagnets subjecting the movable element to a swinging movement as long as the frequencies in the machines or in the machine and the network differ, but causing said element to come to rest on equality in frequency and phase coincidence being attained, said magnets having two magnetic circuits, one of which is closed and highly saturated under normal working conditions and the other is provided with an air gap and unsaturated, the closed circuit receiving the magnetizing coils and the magnetic field in said air gap circuit acting upon said movable element, secondary coils on said air gap circuits of said electromagnets, relays energized by the current from said secondary coils, and a circuit breaker operated by said relays on the voltage of one of the machines or of both machines rising above a predetermined value.

In testimony whereof we have signed our names to this specification.

GERARDUS JACOBUS VAN SWAAY.
HENRI ISAAC KEUS.